March 20, 1956     W. IRBY     2,739,276
COPPER OXIDE RECTIFIER AND METHOD OF MAKING THE SAME
Filed Feb. 23, 1951
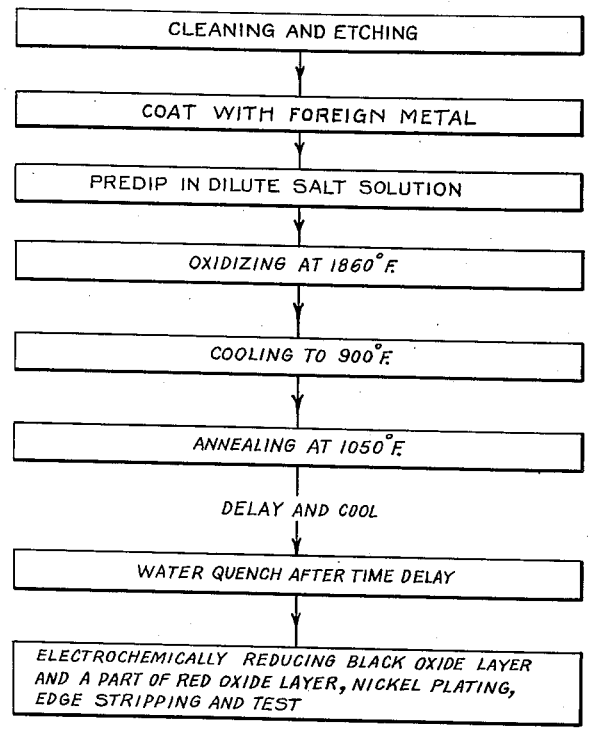
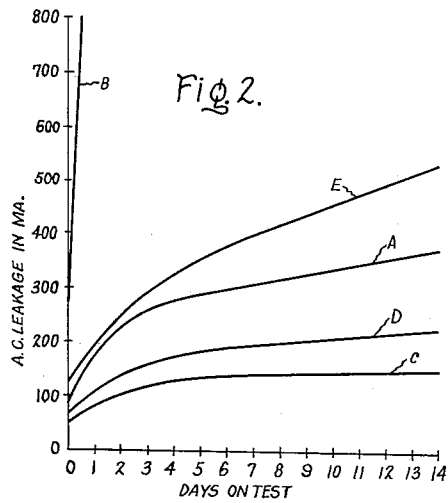
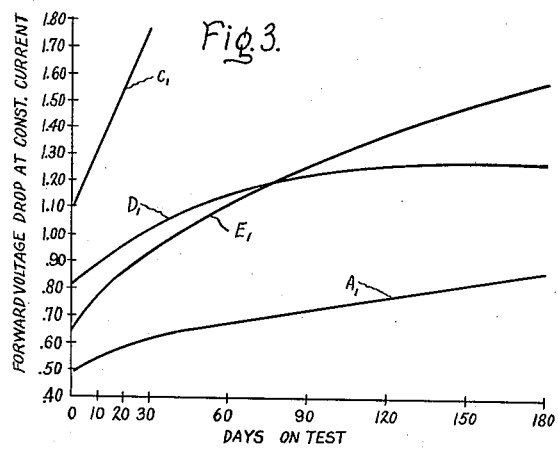
Inventor:
William Irby,
by Claude S. Mott
His Attorney.

United States Patent Office 2,739,276
Patented Mar. 20, 1956

2,739,276

COPPER OXIDE RECTIFIER AND METHOD OF MAKING THE SAME

William Irby, Saugus, Mass., assignor to General Electric Company, a corporation of New York Application February 23, 1951, Serial No. 212,385

9 Claims. (Cl. 317—238)

My invention relates to dry plate rectifiers, and more particularly to copper oxide rectifiers and to methods of making such rectifiers.

A copper oxide rectifier cell, or element, consists essentially of a plate of copper coated on at least one side with a layer of cuprous oxide and provided with a contact layer, such as nickel plating or the like, over the cuprous oxide. It is well known that such a cell possesses a barrier plane or blocking layer at the junction between the copper base and the cuprous oxide layer, which barrier plane evidences itself in the characteristic whereby the cell conducts electric current much more readily across the plane in one direction than in the other direction. This means of course, that the electric resistance of the cell in one direction, known as the forward direction, is very appreciably less than its electric resistance in the other direction, known as the reverse direction. Because of this great difference between forward and reverse resistance of the cell across the barrier plane, the cell exhibits a rectifying action when an alternating potential is applied across the cell. In such a cell "forward" current is that passing into the copper base from the oxide.

In the manufacture of copper oxide rectifier cells by processes heretofore known, copper plates of commercial purity are first thoroughly cleaned and preferably etched by dipping in nitric acid. The plates are then "fired" by exposure to an oxidizing atmosphere in a furnace at about 1800° F. to 1900° F. for a period of about 14 minutes. Thereafter the plates are cooled for about 2½ minutes in a cooling zone of the furnace which is maintained at about 870° to about 930° F. The plates are then annealed for about 9 minutes at a temperature of about 900° to 1100° F. After annealing such plates have heretofore been quenched immediately in cold water, and thereafter dried and prepared for the application of a metal contact layer over the cuprous oxide layer formed upon the copper during the firing operation. In applying such a contact layer the thin outer layer of cupric, or black, oxide which appears upon the outer surface of the cuprous, or red, oxide is first removed, preferably by electrolytic reduction. Thereafter, a layer of metal, such as nickel, is applied to the outer surface of the cuprous oxide, as by electrolytic deposition.

The electric characteristics of any particular copper oxide rectifying cell are not fixed, but change gradually over the useful life of the cell. This is particularly true during the first few days of the cell's use. Thereafter the electrical characteristics of an acceptable cell tend to become relatively fixed or stabilized. The graphical representations of such electrical characteristics over a period of time are known as the aging characteristics of the cells. The aging characteristics which are commonly utilized to determine the quality of the cell are its reverse leakage current characteristic at constant voltage, and its forward voltage drop characteristic at constant current. These aging characteristics are representative, respectively, of the manner in which the reverse and forward electrical resistance of a cell vary with use.

It is evident of course that, in general, it is always desirable to provide a cell whose reverse leakage current is low (i. e. reverse resistance is high) and whose forward resistance is relatively low. It is further desirable that the normal rise in forward resistance and decrease in reverse resistance which is experienced upon first placing a new cell in service shall be relatively temporary and shall not exceed predetermined limits, so that the cell does not destroy itself by overheating. The normal voltage rating of any cell, that is the maximum voltage which may normally be applied to the cell in a reverse direction in operation, is usually determined not by any initial tendency of the cell to break down as a dielectric, but by the fact that beyond a predetermined voltage any particular cell demonstrates such an unfavorable aging characteristic in the reverse direction that it will destroy itself as a rectifier or break down dielectrically due to overheating.

It is supposed that current rectification in a copper oxide cell results from a crystalline and chemical situation wherein the electron flow in one direction is limited by an energy barrier between the copper base and the cuprous oxide layer. The energy barrier results from a difference in effectiveness of the materials on opposite sides of the barrier in acting as electron donors and electron acceptors. The effectiveness of the barrier depends upon the chemical constitution of the cell as well as upon its physical treatment during the process of manufacture.

Accordingly, therefore, it is a general object of my invention to increase the normal operating voltage of a copper oxide rectifier cell appreciably beyond that which has heretofore been attainable, whereby for a given voltage the number of rectifier cells, or elements in a rectifier stack, or assembly, may be significantly reduced.

It is another object of my invention to thus increase the normal operating voltage of a rectifier cell, or element, without adversely affecting the reverse or leakage current through the element.

It is a more particular object of my invention to provide a copper oxide element capable of withstanding a normal operating voltage at least two to three times as high as that heretofore commonly used, without adversely affecting its reverse current or leakage aging characteristic, and without unduly affecting its forward voltage aging characteristic at constant current.

In carrying out my invention in one form I attain the foregoing and other objects by forming copper oxide rectifier elements from copper base plates which have had formed upon their surfaces prior to firing or oxidation an alloy of copper and another metal, such as antimony. Such an alloy may suitably be formed by coating the copper surface with a thin film of antimony, the antimony alloying with the copper at the surface when the coated plate is exposed to an oxidizing atmosphere at elevated temperature. Before firing, however, the antimony coated plate is dipped in a dilute solution of certain salts. Such a solution preferably includes a soluble salt of antimony, a tetraborate, a nitrate of heavy metal, and an organic acid. After the plate is fired, cooled and annealed in the usual way the oxidized plate is exposed to cold air for a predetermined delay interval and then quenched in cold water. The oxidized plate is then prepared for use in the usual manner by nickel plating, or the like, over the oxide surface.

My invention itself will be more fully understood and its various objects and advantages further appreciated by referring now to the following detailed specification taken in conjunction with the accompanying drawing, in which Fig. 1 is a schematic sequence diagram indicating the principal steps in a preferred process of forming a rectifier element embodying my invention; Fig. 2 is a graphical representation of the reverse current or leakage aging characteristics of a rectifier element embodying my invention, shown in comparison with similar characteristics of a rectifier element of a type heretofore commonly used; and Fig. 3 is a similar graphical representation of the forward voltage drop at constant current, or forward aging characteristics, of such rectifier cells.

Referring now to the drawing, a preferred process for manufacturing copper oxide rectifier cells in accordance with my invention is illustrated schematically in the sequential block diagram of Fig. 1. As there indicated, copper base plates of commercial purity are first thoroughly cleaned, and preferably etched by dipping in nitric acid. The clean copper plates are then coated with a very thin film of antimony having a thickness of the order of .000003 to .000005 of an inch. Such an antimony film is preferably formed by a flash electroplating, such as for 10 seconds at 6 amperes, or the equivalent. While I prefer an antimony coating, I find that other metals selected from the group consisting of antimony, bismuth, lead, cadmium, iron and maganese may be utilized to coat the copper base.

After coating the copper plate with antimony, the antimony coated copper plate is dipped in a dilute solution (for example less than 1% concentration) of a soluble salt of antimony. Preferably such a solution includes also a small amount of a tetraborate, a quantity of a nitrate of a heavy metal, and an organic acid to stabilize the antimony salt and hold it in solution. One particular solution which I have found to be satisfactory consists of, by weight, .5% antimony chloride, .05% sodium tetraborate, .1% ferric nitrate, about 3% tartaric acid and the remainder water. I find that certain other salts are also effective as a prefiring dip. In general, the nitrates and perchlorates as well as the chlorides and other halides (i. e., fluorides, bromides or iodides) of antimony, bismuth or iron have significantly beneficial results. I prefer, however, to utilize the foregoing solution of antimony chloride and iron nitrate. The tartaric acid in my preferred solution serves principally to increase the amount of antimony chloride held in solution. The sodium tetraborate serves principally as a cleaning flux.

After dipping the antimony coated copper plate in the solution described above, the plate is fired in the usual manner by exposure to an oxidizing atmosphere at a temperature of about 1800° to 1900° F., preferably 1860° F., for a period of about 14 minutes, cooled for about 2½ minutes in a cooling zone maintained at about 870° to about 930° F., and then annealed for about 9 minutes at a temperature of about 900° F. to 1100° F., preferably at 1050° F.

After annealing the oxidized plate is air cooled to about 500° to 600° F., as by exposure to cold air (for example at about room temperature) for a delay interval of about ½ to 2 minutes, and is then quenched in cold water.

When the plates, or cells, are removed from the cold water quench they are dried and prepared for the application of a metal contact layer, or counter electrode, over the cuprous oxide layer formed during the firing operation. The cells as they come out of the quench bath usually have formed over the cuprous oxide a thin layer of cupric, or black, oxide as a result of exposure to air. This cupric oxide is first removed, preferably by electrolytic reduction to metallic copper. Thereafter, a contact layer of metal, such as nickel, is applied to the outer surface of the cuprous oxide, as by electrolytic deposition. Finally a peripheral area of the cell is stripped of nickel to expose the red oxide, as by treatment in sulphuric acid solution or the like, and the resulting rectifier cells are subjected to suitable testing operations.

The effect of my new and novel process of manufacturing copper oxide rectifier cells may now best be appreciated by referring to the characteristic curves shown at Figs. 2 and 3. As a basis of comparison it may be noted that a standard copper oxide cell of the type heretofore commonly known and having a normal alternating current operating potential of about 6 volts, demonstrates the reverse aging characteristics illustrated at curve A, Fig. 2, and the forward aging characteristic of curve $A_1$, Fig. 3. Fig. 2 shows at curve A the manner in which reverse current, or leakage of such a rectifier, becomes stabilized after a number of days of operation, while Fig. 3 shows at curve $A_1$ the manner in which the forward voltage drop increases only slightly over a number of days of operation at constant current in the forward direction. The effect of operating such a 6 volt rectifier cell at approximately twice its normal operating voltage, for example 12 volts, is illustrated at curve B at Fig. 2. Curve B shows that the leakage current of such a cell, when operated at twice normal operating voltage, increases very rapidly, so that the element soon heats up and becomes useless as a rectifier.

I have discovered that a thin coating of certain metals, and particularly antimony, applied to the copper base plate before firing has the effect of significantly increasing both forward and reverse resistance of a cell. Curve E, Fig. 2, is the reverse aging characteristic at 12 volts for a cell formed in the same manner as the cell of curves A, $A_1$ and B with the single addition of antimony plating before firing. The difference in curves B and E illustrates the increase in reverse resistance due to antimony plating. Similarly, the curve $E_1$, Fig. 3, is the forward aging characteristics of such an antimony plated cell, and the difference between curves $A_1$ and $E_1$, taken at the same constant forward current, illustrates the increase in forward resistance due to antimony plating.

This increase in resistance in both directions may be explained by the fact that antimony, being present in both the copper and the cuprous oxide on opposite sides of the barrier plane, produces an unfavorable condition for electron flow in either direction. In the firing process it is likely that the antimony coating first alloys with the copper at the surface of the plate. After oxidation antimony is present on both sides of the barrier plane. Antimony is a good electron donor, but not an efficient electron acceptor. The same result in different degree arises from coating with bismuth, lead, cadmium, iron or manganese before firing.

I have also discovered if an antimony coated copper plate is fired in the usual manner and then delayed and air cooled before quenching in cold water, both forward and reverse resistance are further increased. These effects are illustrated at curves C and $C_1$, respectively, Figs. 2 and 3, curve C being taken for 12 volt operation, and curve $C_1$ being taken at the same constant forward current used for all the curves of Fig. 3. These curves are taken for a cell formed by the preferred process described hereinbefore except that the salt predip before firing is omitted. The forward aging characteristic of curve $C_1$ is not a satisfactory one, for it does not show a tendency to stabilize in a reasonable time, but the leakage characteristic of curve C is highly satisfactory.

To improve the forward resistance characteristic of the cell without significantly affecting the reverse resistance, I provide the salt dip before firing previously described in conjunction with a delayed quench. When such a dip is utilized in processing an antimony coated plate and the cold water quench delayed, as fully described hereinbefore, the aging characteristics of the resultant cell are shown at curves D and $D_1$, respectively, Figs. 2 and 3. By comparison with curves C and $C_1$ the effect of the salt predip is evident. Curve D, Fig. 2, shows that reverse resistance is decreased (i. e., leakage increased) only slightly. Curve $D_1$, however, shows that the forward resistance is very materially decreased. While the forward resistance represented by the curve $D_1$ is higher than that of a standard cell (curve $A_1$) it is within acceptable limits both in absolute value and in rate of increase. The absolute value of forward resistance is not so significant as is its rate of increase, which must be kept low.

The effect of my salt predip in decreasing forward resistance more than it decreases reverse resistance may be explained from the action of the acid radical (preferably a chloride) in the dip. In the firing process the chloride radical will react with copper in the base layer of the cell to form cupric chloride and cuprous chloride. Any cupric chloride present will undergo reduction to form cuprous chloride and free chlorine, and the free chlorine will react to form more cuprous chloride. In the oxide layer, on the other hand, any free chlorine will not react but will remain entrapped in the layer. Free chlorine is a very good electron acceptor, and the presence of a good electron acceptor in the oxide layer improves forward conduction (i. e., reduces forward resistance). The ferric nitrate probably has a similar effect in providing free oxygen in the oxide layer, and oxygen is also known as an effective electron acceptor.

While I have described a preferred process for making copper oxide rectifier cells as including the three significant steps of coating a copper base plate with metal, dipping the coated plate in a salt solution before firing and delaying the cold water quench after annealing, I find that even without metal coating prior to firing, the delayed quench described, will increase forward and reverse cell resistance. When a salt predip of the type described is utlized to restore an acceptable forward resistance without adversely affecting the reverse resistance of such a cell (i. e., quench delayed but metal coating before firing omitted) an improved high voltage cell results. This procedure involving these two significant steps of salt predip and delayed quench has been described and claimed in my co-pending application Serial No. 433,223, filed May 28, 1954, which is a continuation in part of this application as to this subject matter. Preferably, however, I utilize all three steps to improve my copper oxide rectifier cells. I have found that by this method I have been able to make cells which are entirely satisfactory at operating voltages up to three times those previously used.

Thus, while I have described a preferred embodiment of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. The method of producing a copper oxide rectifier cell which includes coating at least one surface of a copper plate with a thin film of antimony, dipping said coated plate in a dilute water solution of antimony chloride, heating said plate in an oxidizing atmosphere to form a layer of cuprous oxide upon the coated surface thereof, cooling said oxidized plate in air for an appreciable delay interval, and then quenching said plate in cold water.

2. The method of producing a copper oxide rectifier cell which includes coating at least one surface of a copper plate with a thin film of antimony, dipping said coated plate in a dilute water solution of antimony chloride, heating said plate in an oxidizing atmosphere to form a layer of cuprous oxide upon the coated surface thereof, cooling said oxidized plate in air to about 500° to 600° F., and then quenching said plate in cold water.

3. The method of producing a copper oxide rectifier cell which includes coating at least one surface of a copper plate with a thin film of antimony, dipping said coated plate in a dilute water solution containing less than 1%, by weight, of antimony chloride, heating said plate in an oxidizing atmosphere to form a layer of cuprous oxide on the coated surface thereof, exposing said oxidized plate to cold air for a delay interval of the order of ½ to 2 minutes, and then quenching said plate in cold water.

4. The method of producing a copper oxide rectifier cell which includes coating at least one surface of a copper plate with a thin film of antimony, dipping said coated plate in a water solution containing by weight .5% antimony chloride and .1% ferric nitrate, heating said plate in an oxidizing atmosphere to form a layer of cuprous oxide on the coated surface thereof, exposing said oxidized plate to cold air for a delay interval of the order of ½ to 2 minutes and then quenching said plate in cold water.

5. The method of producing a copper oxide rectifier cell which includes coating at least one surface of a copper plate with a thin film of antimony, dipping said coated plate in a water solution containing .5% antimony chloride, .05% sodium tetraborate, .1% ferric nitrate and about 3% tartaric acid, heating said plate in an oxidizing atmosphere at about 1800° to 1900° F. for a period of about 14 minutes to form upon the antimony coated surface thereof a layer of cuprous oxide, cooling said plate for about 2½ minutes in a cooling zone maintained at about 870° to 930° F., annealing said oxidized plate for about 9 minutes at a temperature of about 900° to 1100° F., exposing said plate to cold air for a delay interval of about ½ to 2 minutes and then quenching said plate in cold water.

6. The method of producing a copper oxide rectifier cell which includes electroplating upon at least one surface of a copper plate a thin film of antimony to a thickness less than .000005 of an inch, dipping said plate in a dilute water solution containing less than 1%, by weight, of antimony chloride, heating said plate in an oxidizing atmosphere to form upon the antimony coated surface thereof a layer of cuprous oxide, annealing said oxidized plate at about 900° to 1100° F., exposing said plate to cold air for a delay interval of the order of ½ to 2 minutes, and then quenching said plate in cold water.

7. The method of producing a copper oxide rectifier cell which includes coating at least one surface of a copper plate with a thin film of antimony, dipping said coated plate in a water solution containing by weight .5% antimony chloride and .1% ferric nitrate, heating said plate at about 1800° and 1900° F. in an oxidizing atmosphere to form upon the metal coated surface thereof a layer of cuprous oxide, annealing said oxidized plate at about 900° to 1100° F., exposing said plate to cold air for a delay interval on the order of ½ to 2 minutes and then quenching said plate in cold water.

8. A copper oxide rectifier cell comprising a base plate of copper containing adjacent one surface thereof a quantity of antimony, and an integral layer of cuprous oxide overlying said one surface and containing antimony.

9. A copper oxide rectifier cell comprising a base plate of copper containing antimony and cuprous chloride, and an integral layer of cuprous oxide upon at least one surface of said plate containing antimony and cuprous chloride.

References Cited in the file of this patent

UNITED STATES PATENTS

| | | |
|---|---|---|
| 1,769,852 | Ogden | July 1, 1930 |
| 1,834,275 | Geiger | Dec. 1, 1931 |
| 1,926,132 | Ackerly | Sept. 12, 1933 |
| 1,936,792 | Kahler | Nov. 28, 1933 |
| 2,060,905 | Smith | Nov. 17, 1936 |
| 2,081,051 | Friederich | May 18, 1937 |
| 2,172,576 | Cubitt | Sept. 12, 1939 |
| 2,213,389 | Dowling | Sept. 3, 1940 |
| 2,215,890 | Taylor | Sept. 24, 1940 |
| 2,246,328 | Smith | June 17, 1941 |
| 2,261,348 | Doucet | Nov. 4, 1941 |
| 2,276,647 | Conrad et al. | Mar. 17, 1942 |
| 2,328,626 | Dowling | Sept. 7, 1943 |
| 2,592,975 | Taylor | Apr. 15, 1952 |

FOREIGN PATENTS

| | | |
|---|---|---|
| 120,771 | Australia | Dec. 20, 1945 |